United States Patent [19] [11] Patent Number: 4,750,707
Johncox et al. [45] Date of Patent: Jun. 14, 1988

[54] ANGLE VALVE

[75] Inventors: Ronald L. Johncox; R. Dale Moretz; Richard M. France, all of Jackson, Mich.; David P. Passerell, Geneva, Ohio

[73] Assignee: Perfection Corporation, Madison, Ohio

[21] Appl. No.: 98,019

[22] Filed: Sep. 17, 1987

Related U.S. Application Data

[63] Continuation of Ser. No. 920,656, Oct. 20, 1986, abandoned.

[51] Int. Cl.⁴ ............................................. F16K 5/04
[52] U.S. Cl. .................................... 251/304; 251/286; 251/904
[58] Field of Search ................ 251/304, 309, 310, 312, 251/286; 137/375

[56] References Cited

U.S. PATENT DOCUMENTS 3,166,097  1/1965  Hinderer et al. ............... 137/625.17
3,333,812  8/1967  Mueller .............................. 251/164
3,542,336  11/1970  Giese ................................. 251/181

Primary Examiner—A. Michael Chambers
Attorney, Agent, or Firm—Fay, Sharpe, Beall, Fagan, Minnich & McKee

[57] ABSTRACT

A valve for regulating fluid flow between a pair of angularly disposed passages. A valve body closely receives a valve member therein and both components are preferably formed of a polymeric material for corrosion protection. The valve member includes first and second grooves spaced therealong, and has a handle disposed at one end thereof. The first groove is of a generally elliptical conformation having a pair of arcuate portions disposed axially and approximately 180° circumferentially from each other. A pair of interconnecting portions extend between the arcuate portions. A stiffener is included in the valve member for limiting deformation and deflection thereof during high fluid pressure conditions.

16 Claims, 2 Drawing Sheets

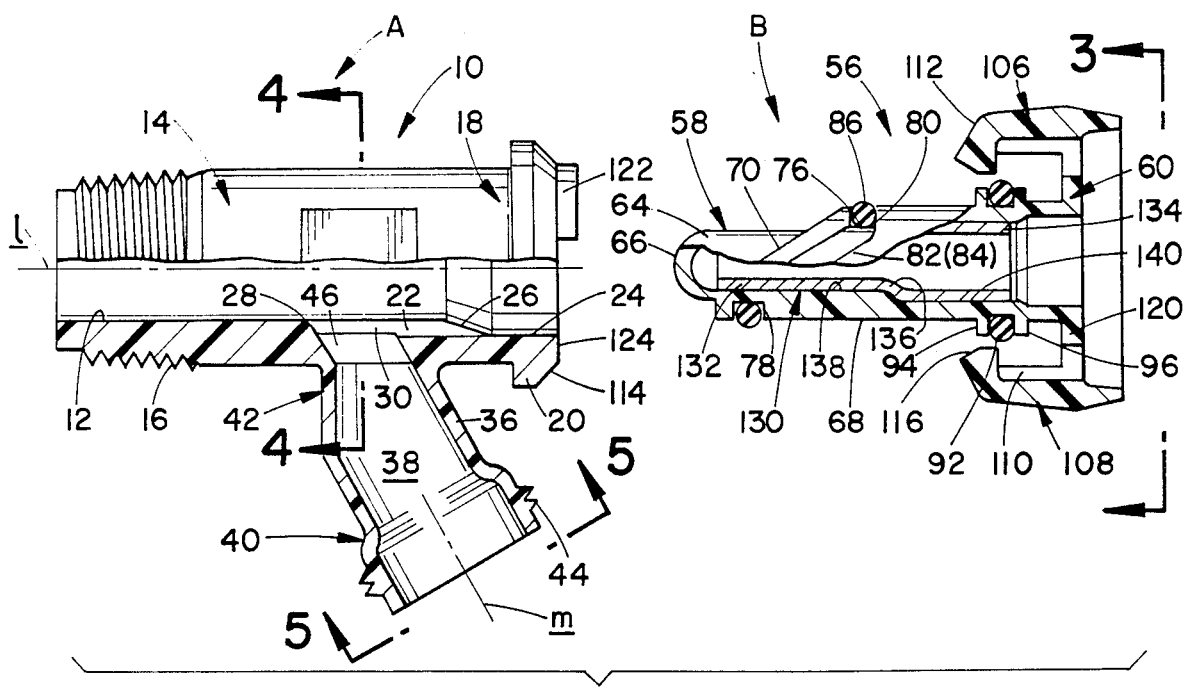
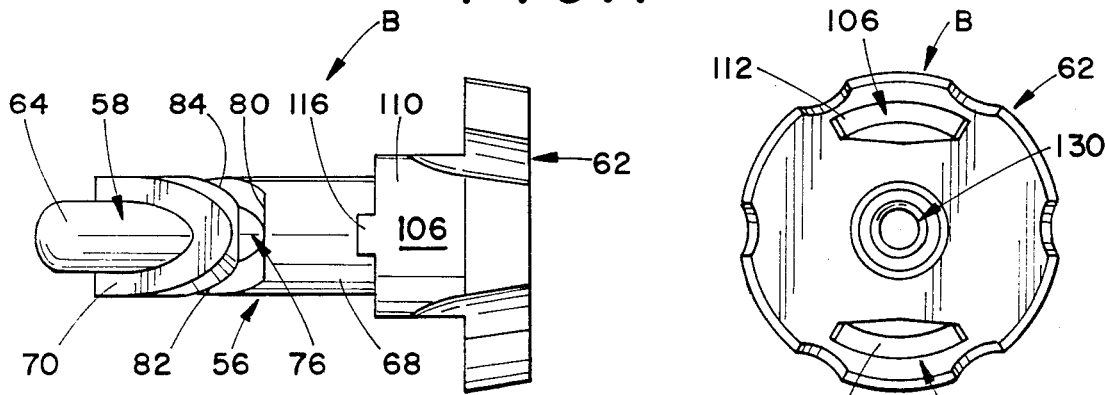
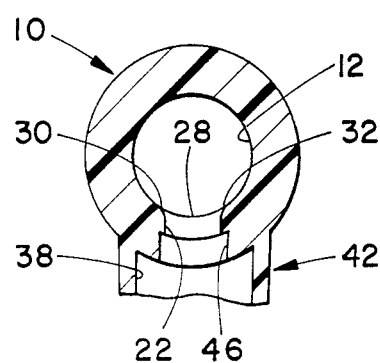
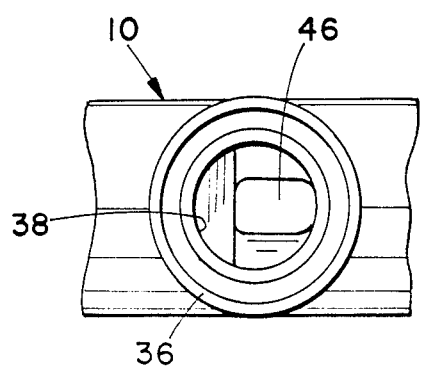

ANGLE VALVE

This application is a continuation of application Ser. No. 920,656, filed Oct. 20, 1986, now abandoned.

BACKGROUND OF THE INVENTION

This invention pertains to the art of valves and, more particularly, to drain valves. The invention is particularly applicable to a drain valve for use with a water heater or an on/off valve in a related environment and will be described with particular reference thereto. However, it will be appreciated that the invention has broader applications and may be advantageously employed in other fluid control environments.

Prior art on/off valves used to drain a water heater or similar appliances have suffered from various drawbacks. The infrequent use of valves of this type requires a durable, reliable sealing structure that is unaffected by extended periods of non-use and the corrosive effects of the system fluid. One particular drawback is the structural complexity of the valves requiring close tolerances which are expensive to machine. The intricate passageways, valve assemblies, valve seats, and seals are subject to wear over time or are constructed of metallic materials which are subject to corrosion. Due to infrequent use of the drain valves in such an environment, various operative components of the valve have frozen or fused together requiring drastic, or even destructive, action to obtain valve opening.

Later developments in valves of this general type have utilized non-metallic materials in an effort to overcome the corrosion problems. Various types of plastic or other non-metallic valves have been developed, all with associated production difficulties, excessive costs, and performance problems. For example, some plastics are unable to withstand the high pressures associated with the pressure head and were subjected to deflection or deformation. This eventually led to improper sealing or difficulty in operating the valve. Still other prior designs lacked the close tolerances necessary to provide a seal-tight assembly. Yet others were no less expensive than their metallic counterparts with limited, if any, benefits realized thereover.

It has, therefore, been considered desirable to produce a valve that is not only economical to manufacture but also relatively easy to operate. The valve must be durable and able to withstand extended periods of infrequent use. The various elements of the valve should be substantially immune to the deleterious effects of high pressure and corrosive action caused by interaction with the system fluid in a water heater or similar environment. Additionally, the valve must provide an effective, reliable seal and have precise on/off positions.

The subject invention is deemed to meet the foregoing needs and provide a new angle valve construction which overcomes many of the above-noted problems and others.

SUMMARY OF THE INVENTION

In accordance with the invention, a new angle valve is provided which is comprised of a generally cylindrical main body portion having a first passage extending therethrough and a second or branch body portion having a second passage therein operatively communicating with the first passage. A valve member is closely received in the cylindrical body for selectively controlling fluid communication between the first and second passages. More particularly, the valve member includes first and second circumferential grooves. The first groove has a first arcuate portion at one end of the valve member and a second arcuate portion circumferentially and axially spaced therefrom. Angular interconnecting portions extend on opposed sides of the valve member between the first and second arcuate portions thereby defining a generally elliptical conformation in a plane angularly disposed with respect to the valve member longitudinal axis. The second groove is adjacent the other end of the valve member and extends generally transverse to the longitudinal axis. The angle valve also includes means for selectively rotating the valve member between valve open and closed positions.

According to another aspect of the present invention, the valve member includes an angularly disposed surface for selectively controlling fluid flow from the first passage to the second passage in response to movement of the valve member between the valve open and closed positions.

According to another aspect of the invention, a stop member is provided for limiting relative rotational movement between the valve member and main body portion.

In accordance with a still further aspect of the invention, a stiffener element is closely received in the valve member for limiting flexure thereof.

In accordance with a still further aspect of the invention, the angle valve body and valve member are constructed from polymer materials.

A principal advantage of the subject invention is the provision of a drain valve which is both simple to manufacture and operate.

A further advantage of the invention resides in the non-corrosive construction of the valve components.

Another advantage of the invention is found in the effective sealing obtained from the valve and its ability to withstand high pressure applications.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1 is an exploded view in partial cross-section showing the subject new valve construction;

FIG. 2 is a view of the valve member taken from above the view shown in FIG. 1;

FIG. 3 is an end view of the valve member handle taken generally along lines 3—3 of FIG. 1;

FIG. 4 is a cross-sectional view of the valve body taken generally along lines 4—4 of FIG. 1;

FIG. 5 is a view of the branch passage of the valve body taken generally along lines 5—5 of FIG. 1;

DETAILED DESCRIPTION OF THE PREFERRED EMBODIMENT

Figure 6:
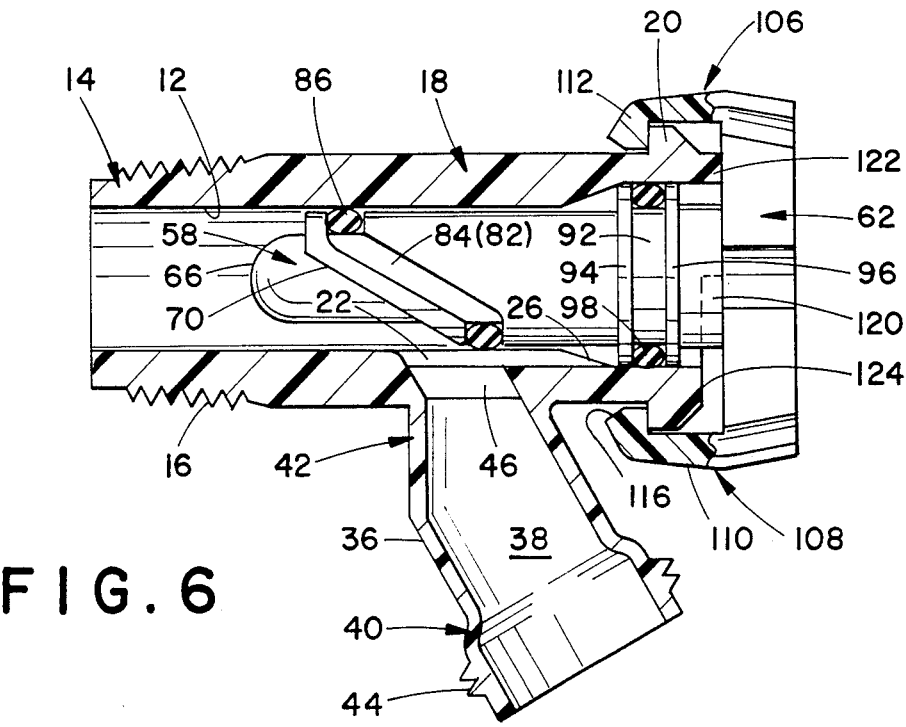
FIG. 6 is an enlarged cross-sectional view of the assembled valve in the open position; and, FIG. 7 is a cross-sectional view similar to FIG. 6 showing the assembled valve in the closed position.

Referring now to the drawings wherein the showings are for purposes of illustrating the preferred embodiment of the invention only and not for purposes of limiting same, FIGS. 1 and 2 show a valve body A which is adapted to closely receive a valve member B therein and adapted to regulate fluid flow from the base of a water heater or some similar device (not shown). The valve body includes a first generally cylindrical body portion 10 having a first bore or passage 12 extending therethrough along a longitudinal axis 1. A first end 14 includes an externally threaded portion 16 adapted for cooperative engagement with a female receptacle or coupling at the base of a water heater or similar appliance (not shown). A second end 18 includes an external radial shoulder 20 adapted to fixedly retain an operating handle as will be explained further hereinbelow. The first passage 12 includes a recessed area 22 that extends axially from approximately mid-span thereof to a counterbore 24 formed in the second end 18. A tapered shoulder 26 smoothly interconnects the varying diameters of the first bore 12 and counterbore 24.

Provision is also made for a smooth transition between the recessed area 22, the first passage 12, and the counterbore 24. With particular reference to FIGS. 1 and 4, a first radial region 28 defines a smooth longitudinal merger along the circumferential length of the recessed ara 22 with the first passage 12. As will become more apparent hereinbelow, this first radial region 28 assists in insertion of the valve member B into valve body A. Further, the first radial region eliminates seal member pinching during valve member rotation. Likewise, opposed second and third radial regions 30, 32 define a smooth circumferential merger along the longitudinal length of the recessed area 22 with the first passage. The second and third radial regions also eliminate any destructive pinching action with the valve member.

A second cylindrical body portion or branch 36 is angularly disposed with respect to the first cylindrical member 10. This branch includes a central bore or passage 38 that extends from a first or outer end 40 to a second or interconnecting end 42. A longitudinal axis m of passage 38 generally defines the angular orientation of the branch 36 with respect to the first cylindrical member 10. Outer end 40 includes an externally threaded portion 44 adapted for cooperative receipt in a corresponding female coupling such as a garden hose coupling or the like. The interconnecting end 42 is generally perpendicularly disposed to the longitudinal axis 1 of the first cylindrical body portion whereas the outer end 40 is angularly disposed therewith. An opening 46 (FIG. 5) communicates between the bore 12 and the branch central bore 38 and is elongated generally parallel to axis 1. The elongated opening penetrates the first body portion at recessed area 22 whereby any fluid entering passage 12 is effectively conveyed toward the elongated opening 46.

With continued reference to FIG. 1, and with additional reference to FIGS. 2 and 3, the valve member B includes an elongated and generally hollow stem 56 extending from a first end 58 to a second end 60. Second end 60, in turn, includes a handle 62 thereon. The first end 58 includes a generally cylindrical extension 64 having a first predetermined dimension and terminates in a spherical end surface 66. End surface 66 defines a smooth, curvilinear or spherical end having a diameter substantially smaller than the diameter of first passage or bore 12. A concentric, generally cylindrical region 68 is interposed between the extension and handle 62.

Figure 7:
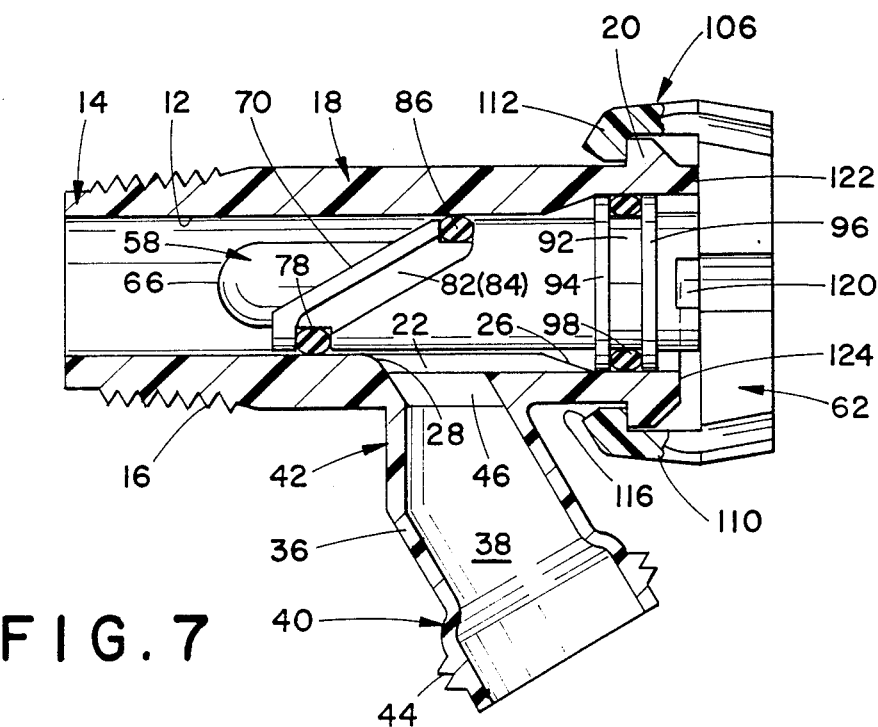

This region includes surface 70 adjacent the first end of the stem that is angularly disposed with respect to longitudinal axis 1 when the stem is received in passage 12. More specifically, the angular surface 70 is generally perpendicular to the axis m of second passage 38 when the valve is in a fully closed position (FIG. 7).

The concentric cylindrical region 68 includes a first groove 76 disposed adjacent the first end 58. This first groove 76 is generally parallel to the angular surface 70 and includes a first arcuate portion 78 and a second arcuate portion 80. The second arcuate portion is circumferentially disposed approximately 180° and axially spaced from the first arcuate portion. The first groove is of constant width and depth around the concentric cylindrical region, and includes first and second angular interconnecting portions 82, 84 extending between the first and second arcuate portions on opposed sides of the valve stem.

The first groove 76 is adapted to closely receive a first seal member 86, such as a polymeric O-ring or the like. At the time of valve assembly, the angular orientation of the first groove with respect to the axis 1 deforms the seal member into a generally elliptical conformation as the seal is placed in the first groove 76. More particularly, when the valve is closed as shown in FIG. 7, the foci of the elliptical shape are in a plane parallel to angular surface 70. Moreover, this plane is generally perpendicular to the axis m of passage 38 in second cylindrical body portion 36 when the stem is in the valve closed position (FIG. 7) and generally parallel to the branch axis in the open position (FIG. 6).

A second groove 92 is interposed axially along the stem between the first groove and handle 62. This second groove is formed by a pair of rings 94, 96 extending radially outward from the cylindrical region 68. The base of the second groove 92 is defined at a radial distance slightly greater than the radial dimension of the cylindrical region 68. A second seal member 98, such as a polymeric O-ring or the like is closely received in the second groove 92 between the ring pair 94, 96, and is designed for sealingly engaging the counterbore 24 in the valve body A.

The handle 62 is disposed at the second end 60 of the valve member and has a generally circular conformation (FIG. 3). The handle includes a pair of retaining flanges 106, 108 extending axially inward or toward the first end 58. Each retaining flange is generally L-shaped in cross-section, including a first axially extending leg 110 and a second radially inward extending lip 112. The radially extending lip 112 of each flange is designed for retaining engagement with annular shoulder 20 of the valve body in the assembled condition. More particularly, the annular shoulder 20 has a conically tapered surface 114 which is designed to resiliently spread the retaining flanges 106, 108 in a radially outward direction during axial insertion of the valve member B into the valve body A. The retaining flanges spread radially outward under the axially applied force and snap into retaining engagement behind the shoulder as illustrated in the assembled condition of FIGS. 6 and 7. Necessarily, the radially outward movement of the retaining flanges does not exceed the elastic limit of the material so that the flanges snap radially inward and thereafter prevent axial withdrawal of the valve member.

More particularly, the radially extending lip 112 of each retaining flange 106, 108 includes a camming surface portion 116 that tapers radially as it extends in an axial direction. The camming surface portions 116 extend in generally parallel, facing relation with conically tapered surface 114 on the valve body. During axial insertion of the valve member B into the valve body A, the camming surface portions engage the conically tapered surface and facilitate sliding contact between these members. As described above, the retaining flanges spread radially outward and snap inwardly into assembled arrangement A stop member 120 extends radially and axially outward on the valve member B adjacent handle 62. This stop member preferably comprises a raised flange designed to cooperatively engage a generally semi-circular axial extension 122 on the valve body. The stop member is arranged for continuous abutting engagement with end face 124 of the valve body and selective interfering engagement with the opposite end areas of semi-circular extension 122 for limiting the degree of permissible rotational movement of the valve member relative to the valve body. The size of the arc defined by extension 122 is preselected for cooperation with stop member 120 so that the limits of the valve member rotation are defined in the valve fully open and closed positions.

With particular reference to FIGS. 6 and 7, the open and closed positions, respectively, of the angle valve assembly are shown. In FIG. 6, the innermost axial extend of angular surface 70 in passage 12, that is, the region adjacent curvilinear surface 66, is disposed approximately 180° from the elongated opening 46, and the outermost axial extent of the opposite region of angular surface 70 is spaced rearwardly of opening 46. In this position, the angular surface 70 is somewhat generally parallel with the axis m placing passages 12, 38 in communication with each other. Thus, fluid flow entering the first end 14 of cylindrical body portion 10 can freely pass into passage 38 of the second body portion or branch.

The first seal member 86 sealingly engages the first passage 12 to prevent fluid flow therepast. A minute amount of fluid is able to enter the recessed area 22 during rotation of the valve member about longitudinal axis 1 between valve open and closed positions as well as in the valve open position. This fluid is prevented from exiting the second end 18 of the first body portion due to seal member 98 sealingly engaging the inner surface of counterbore 24.

Rotation of the handle imparts rotary motion to the valve stem until stop member 120 engages the semi-circular extension 122 at an area spaced approximately 180° from its engaging position with the extension in the valve open position. This represents the closed position illustrated in FIG. 7. As is apparent, the plane defined by the angular surface 70 extends generally normal to the axis m in the closed position. The first arcuate portion 78 is disposed adjacent the recessed area 22 on the same side of passage 12 as the second passage 38. This orientation of the seal member 86 prevents any fluid communication between the first and second passages.

As described above, rotation of the valve member B selectively closes off communication between the first passage 12 and the branch passage 38 due to the angular orientation of seal member 86. The first seal member necessarily passes over the recessed area as the valve member opens and closes. A sharp, abrupt merger area between the recessed area 22 and the first passage would continuously pinch or tear the seal member but, in accordance with the preferred embodiment, radial regions 28, 30 and 32 eliminate the destructive action that would otherwise be imposed on the seal member. Additionally, a slightly larger O-ring is used as the seal member. The larger cross-section of the O-ring provides greater strength and the larger radius assists in squeezing the O-ring between the first passage and the first groove 76. More reliable sealing, as well as longer life of the seal member, results from these critical design changes.

A stiffener 130 (FIGS. 1 and 3) is preferably disposed within the hollow construction of the valve member B. This stiffener 130 is typically formed of metal to provide added support to the valve member stem. Moreover, in the preferred embodiment, the stiffener is of stepped construction including first and second generally cylindrical portions 132, 134. As seen in FIG. 1, first portion 132 is of a smaller diameter than second portion 134, and a tapered region 136 interconnects the two portions so that the stiffener is of a unitary structure. The stiffener is, likewise, closely received in concentric cavities or recesses 138, 140 formed in the hollow valve member. The stiffener prevents the stem, particularly spherical end 66, from deflecting under the influence of high pressures encountered in a water heater or similar environment. The stiffener effectively limits destructive loading of the valve member and the seals disposed between the valve member and valve body. In the absence of stem deflecting conditions, the seals generally maintain their rounded conformation and are prevented from forming flat regions under the influence of increased pressure. Retention of the original conformation of the seals presents a more effective sealing arrangement. Additionally, the stiffener 130 is completely enclosed from contact with the water or other fluid to thereby inhibit any corrosive action therewith. Only the polymeric or other non-metallic construction of the valve member, valve body, and seal members are placed in communication with the system fluid.

The valve body A and valve member B are separately formed from a suitable polymeric material. The valve member, particularly valve stem 56, is received in first passage 12 along the longitudinal axis 1 and the first end 14 of the first body portion threadedly engages an aperture in a water heater or other device. The valve member is normally placed in the closed position (FIG. 7), and the open position (FIG. 6) permits periodic draining of the water heater to remove sediment therefrom. Simple manual rotation of the handle opens and closes communication between the first and second passages 12, 38 as desired. The stiffener provides extra support for the valve stem to maintain the original configuration and sealing action of the assembly.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An angle valve comprising:
   a generally cylindrical first body portion formed of a non-corrosive material having a first passage extending therethrough along a first longitudinal axis;
   a second body portion operatively engaging said first body portion and having a second passage extending therethrough along a second longitudinal axis, said first and second passages communicating with each other such that said first and second axes are in relative angular disposition;

a valve stem formed of a non-corrosive material closely received in said first passage and moveable therein for selectively regulating fluid flow between said passages;

said valve stem including a first groove receiving a first seal member therein, said first groove and first seal member having a generally elliptical conformation defined in a plane angularly disposed with respect to said first axis; and, a longitudinal recess in said valve stem adapted to closely receive a metallic stiffener member therein for limiting flexing thereof.

2. The angle valve as defined in claim 1 wherein said valve stem further includes a second groove receiving a second seal member therein, said second groove axially spaced from said first groove.

3. The angle valve as defined in claim 1 further comprising a handle formed on said valve stem for selectively rotating said stem about said first axis between open and closed positions.

4. The angle valve as defined in claim 1 further comprising a stop member on said valve stem cooperating with said first body portion for limiting rotational movement therewith.

5. The angle valve as defined in claim 1 wherein said stiffener member includes first and second portions of differing radial dimension received in corresponding first and second recess portions.

6. An angle valve comprising:

a first body portion having a first passage extending therethrough along a longitudinal axis;

a second body portion having a second passage extending therethrough for operative communication with said first passage;

a valve member formed of a polymeric material having a stem closely received in said first passage and selectively controlling fluid communication between said passages;

said stem of generally cylindrical configuration having first and second circumferential grooves therein;

said first groove having a first arcuate portion disposed adjacent one end of said stem and a second arcuate portion circumferentially disposed approximately 180° from said first arcuate portion and axially spaced therefrom, said first groove including angular interconnecting portions each extending axially and circumferentially between said first and second arcuate portions on opposed sides of said stem;

said second groove disposed adjacent a stem other end and extending generally transverse to said longitudinal axis;

first and second seal members received in said first and second grooves, respectively;

a handle formed on said valve member for selectively rotating said stem about said longitudinal axis between open and closed positions; and, a longitudinally extending stiffener received in said stem for limiting flexing of said stem one end, said stiffener being completely enclosed in said stem to inhibit contact with fluid flow through said valve.

7. The angle valve as defined in claim 6 further comprising a stop member on said valve member cooperating with said first body portion for limiting rotational movement of said stem.

8. The angle valve as defined in claim 6 further comprising a shoulder at a first body portion other end and a generally L-shaped flange on said handle engaging said shoulder for retaining said stem in said first body portion.

9. The angle valve as defined in claim 6 wherein said second groove is concentric with said first groove at a radially outer position along said longitudinal axis.

10. The angle valve as defined in claim 6 wherein said stiffener includes first and second portions, said first portion having a radial dimension less than said second portion for corresponding receipt in first and second recess portions defined in said stem.

11. An angle valve comprising:

a first body portion formed entirely of a polymeric material having a first passage extending therethrough along a longitudinal axis;

a second body portion formed entirely of a polymeric material having a second passage angularly disposed with respect to said first passage and operatively communicating therewith;

a hollow valve member formed of a polymeric material closely received in said first passage and selectively controlling fluid communication between said passages;

an elongated metallic stiffener totally enclosed within said valve member to inhibit corrosive action with a fluid in said valve, said stiffener limiting flexure of said valve member under high pressure fluid conditions;

said valve member having first and second circumferential grooves therein;

said first groove having a first arcuate portion disposed adjacent one end of said valve member and a second arcuate portion circumferentially disposed approximately 180° from said first arcuate portion and axially spaced therefrom, said first groove including angular interconnecting portions each extending between said first and second arcuate portions on opposed sides of said valve member;

said second groove disposed adjacent a valve member other end and extending generally transverse to said longitudinal axis;

first and second seal members received in said first and second grooves, respectively;

means for selectively rotating said valve member about said longitudinal axis between open and closed positions; and, a peripheral flange on said first body portion and generally L-shaped retaining means on said valve member cooperating with said peripheral flange whereby said valve member is retained in said first body portion.

12. The angle valve as defined in claim 11 further comprising a valve member surface angularly disposed with respect to said longitudinal axis at said valve member one end whereby said second passage is selectively open and closed for communication with said first passage.

13. The angle valve as defined in claim 11 further comprising a stop member for limiting rotational movement of said valve member with respect to said first body portion.

14. The angle valve as defined in claim 13 wherein said stop member includes a radially extending flange on said valve member operatively engaging a shoulder on said first body portion.

15. The angle valve as defined in claim 11 wherein said hollow valve member includes first and second cavity portions of varying diameter, said stiffener includes first and second portions for corresponding receipt in said first and second cavity portions.

16. The angle valve as defined in claim 11 further comprising cooperating facing surfaces angularly disposed with respect to said longitudinal axis and facilitating insertion of said valve member into said first passage.

* * * * *